J. S. OSTROM.
SOUND BOX.
APPLICATION FILED NOV. 30, 1914.
1,166,627.
Patented Jan. 4, 1916.
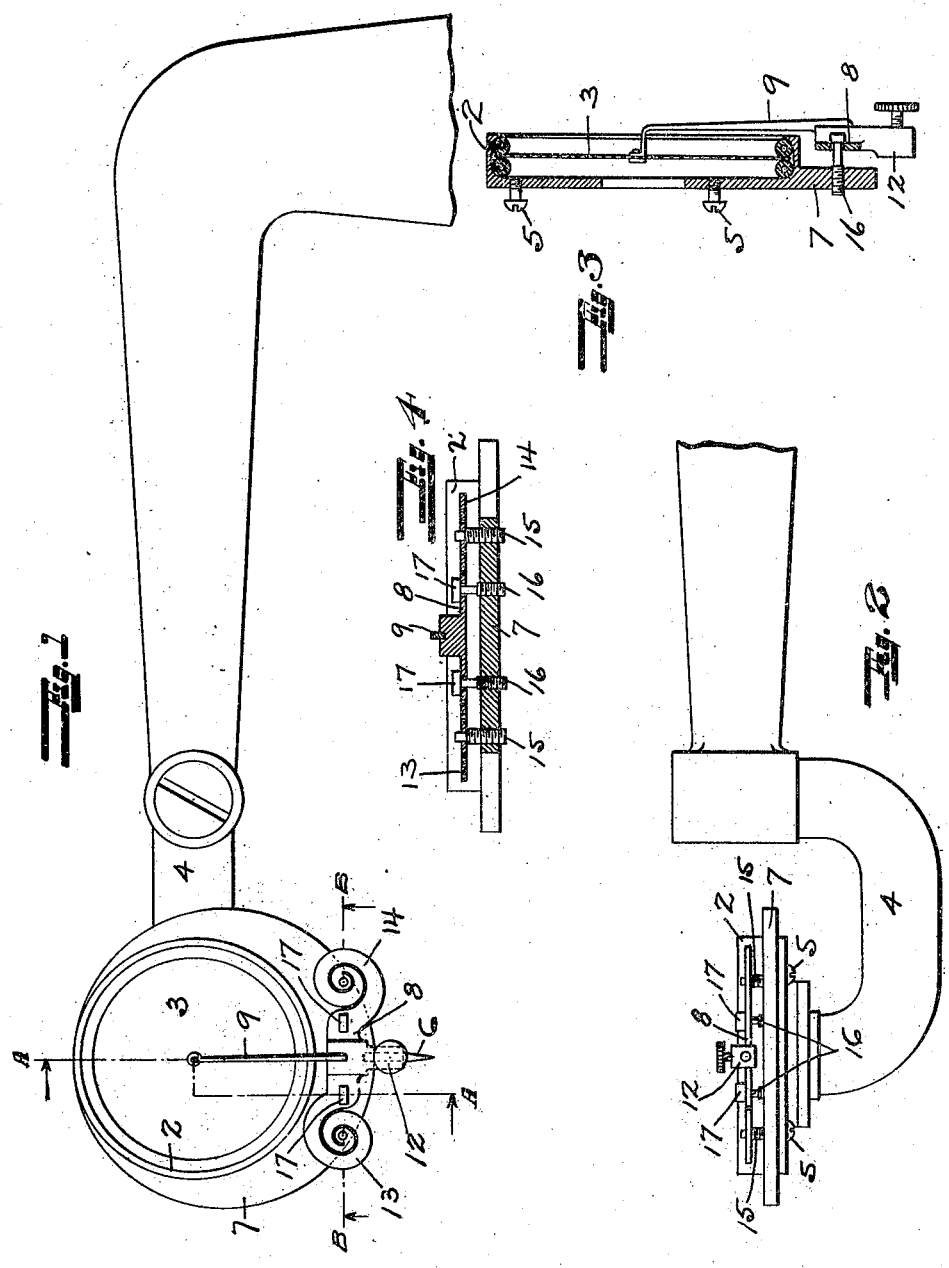
WITNESSES:
J. B. Gardner.
INVENTOR.
JOHN S. OSTROM
BY White + Prest.
his ATTORNEYS.

UNITED STATES PATENT OFFICE.

JOHN S. OSTROM, OF SAN FRANCISCO, CALIFORNIA.

SOUND-BOX.

1,166,627.  Specification of Letters Patent.  Patented Jan. 4, 1916.

Application filed November 30, 1914. Serial No. 874,790.

*To all whom it may concern:*

Be it known that I, JOHN S. OSTROM, a citizen of the United States, and a resident of the city and county of San Francisco, State of California, have invented a new and useful Sound-Box, of which the following is a specification.

The invention relates to sound boxes for sound reproducing or recording machines.

An object of the invention is to provide a sound box which will cause a clear and correct reproduction of the sound.

Another object of the invention is to provide a sound box in which the vibrations are unhampered in their travel between the stylus and diaphragm.

The invention possesses other advantageous features, some of which, with the foregoing, will be set forth at length in the following description, where I shall outline in full that form of the invention which I have selected for illustration in the drawings accompanying and forming part of the present specification.

In the drawings I have shown only one specific form of my generic invention, but it is to be understood that I do not limit myself to such form because my invention may be embodied in a multiplicity of forms, each being a species of my said invention.

It is also to be understood that by the claims succeeding the description of my invention, I desire to cover the invention in whatever form it may be embodied.

Referring to said drawings: Figure 1 is a side view of the sound box of my invention mounted on the sound conducting arm, the sound box being shown with the stylus at right angles to the arm for purposes of convenience. Fig. 2 is an underneath view of the sound box and arm taken in the position shown in Fig. 1. Fig. 3 is a cross section of the sound box taken on the line A—A Fig. 1. Fig. 4 is a cross section of the sound box taken on the line B—B Fig. 1.

The sound box of my invention comprises the casing 2 in which the diaphragm 3 is arranged in any suitable manner. The casing is securely attached to the horn or sound conducting armor or tube 4, by any suitable means, such as the screws 5. The sound box is usually arranged so that the needle or stylus 6 lies at an acute angle to the adjacent surface of the sound record, but in the drawings, for the purpose of convenience, the needle is disposed so that it lies at a right angle to the surface of the record.

Secured to the casing 2 and preferably formed integral therewith, is a plate 7, preferably circular in shape and arranged eccentrically with respect to the casing, so that a portion of the plate extends below the casing. Mounted on the plate 7 below the casing is a resilient element 8 to which the stylus bar 9 and the stylus holder 12 are rigidly attached, preferably by brazing. The resilient element to which the stylus bar and stylus holder are attached comprises a flat bar formed at its opposite ends in the shape of flat spirals 13—14, which act as springs to produce the resiliency of the element. The bar forming the spirals has its greater cross sectional dimension in a plane parallel to the plane of the diaphragm and its smaller cross sectional dimension in a plane at right angles to the plane of the diaphragm, and the flat spirals lie substantially in a plane parallel to the plane of the diaphragm, so that the portion of the bar intermediate the spirals is free to vibrate in any direction, but more particularly in a plane at right angles to the plane of the diaphragm. Therefore, the vibrations produced by the record on the stylus are conveyed to the diaphragm without any damping effect.

The spring bar 8 is mounted on the plate 7 in such manner that it is free to vibrate under the influence of the impulses of the sound record. The bar is supported at its opposite ends by pins or screws 15, which engage the bar at the centers of the spirals. The pins 15 are preferably screwed into the plate 7, and at their outer ends fit snugly into holes at the centers of the spirals. These pins serve the purpose of carrying or supporting the resilient bar. The bar is pressed onto the pins 15 by means of the screws 16 arranged at opposite sides of the center of the bar. These screws 16 pass through clearance holes in the bar so that the bar may vibrate, and engage the plate 7. The screws 16 and the pins 15 are alined and lie in a plane at right angles to the stylus bar 9, so that the stylus bar is in effect resiliently pivoted at the line drawn through the pins and screws, thereby allowing the stylus bar to vibrate freely as a whole under the influence of the impulses of the record. The impulses or markings of the record are usually at right angles to the plane of the diaphragm and by constructing the stylus bar mounting so that the stylus bar may readily vibrate in the plane at right angles to the diaphragm, the vibrations on the record are efficiently conveyed to the diaphragm. The clamping screws 16 are preferably provided with elongated heads 17 which are disposed in the direction of the line through the pins, so that the heads will not interfere with the vibration of the bar. The tension on the stylus bar carrying bar 8 may be varied by adjusting the carrying pins or the clamping screws or both. The stylus bar is firmly but resiliently supported and is resiliently mounted between the needle and the connection with the diaphragm, so that all of the vibrations of the record are conducted directly to the diaphragm.

I claim:

1. In a sound box, a casing, a diaphragm arranged in said casing, a stylus bar attached to said diaphragm, a bar to which said stylus bar is attached, said last named bar being provided at its ends with flat spiral portions, and means for supporting said last named bar at its ends.

2. In a sound box, a casing, a diaphragm arranged in said casing, a stylus bar attached to said diaphragm, and a flat bar having flat spiral ends supported at its ends on said casing and to which said stylus bar is attached, the stylus bar lying at a right angle to a line through the points of support of the flat bar.

3. In a sound box, a casing, a diaphragm arranged in said casing, a stylus bar attached to said diaphragm, a flat bar having flat spiral ends to which the stylus bar is attached intermediate said spiral ends, pins engaging the casing and the center of said spirals, and screws passing through the flat bar intermediate the spirals and engaging the casing adapted to press the bar firmly against the pins.

4. In a sound box, a stylus bar, a stylus bar mounting comprising a flat bar having spiral ends, means for supporting the flat bar at its ends, and means arranged intermediate the ends for pressing the bar against said supporting means, the pressing means and the supporting means being alined and being disposed in a plane at right angles to the stylus bar.

5. In a sound box, a stylus bar, a flat bar having flat spiral ends to which the stylus bar is attached intermediate said ends, supporting pins engaging the center of the said spiral ends and tension screws passing through the flat bar intermediate the spirals, said supporting pins and tension screws being in alinement.

6. In a sound box, a stylus bar, and a supporting bar for said stylus bar terminating in flat spiral portions.

7. In a sound box, a stylus bar, and a flat bar having spiral ends to which said stylus bar is attached, said flat bar being supported at the center of said spiral ends.

In testimony whereof, I have hereunto set my hand at San Francisco, California, this 25th day of November, 1914.

JOHN S. OSTROM.

In presence of—
  H. G. PROST,
  M. LE CONTE.